(12) United States Patent
Leeke et al.

(10) Patent No.: US 6,609,891 B2
(45) Date of Patent: Aug. 26, 2003

(54) TURBINE AIRFOIL FOR GAS TURBINE ENGINE

(75) Inventors: Leslie Eugene Leeke, Burlington, KY (US); Sean Robert Keith, Fairfield, OH (US); Ronald Eugene Mc Rae, Jr., Wyoming, OH (US); Lawrence Paul Timko, Fairfield, OH (US); David Alan Frey, West Chester, OH (US)

(73) Assignee: General Electric Company, Schenectady, NY (US)

( * ) Notice: Subject to any disclaimer, the term of this patent is extended or adjusted under 35 U.S.C. 154(b) by 75 days.

(21) Appl. No.: 09/943,527

(22) Filed: Aug. 30, 2001

(65) Prior Publication Data

US 2003/0044276 A1 Mar. 6, 2003

(51) Int. Cl.$^7$ .................................................. F01D 5/18
(52) U.S. Cl. ..................................... 416/97 R; 415/115
(58) Field of Search ........................ 415/115; 416/97 R, 416/96 R, 96 A

(56) References Cited

U.S. PATENT DOCUMENTS

| | | | | |
|---|---|---|---|---|
| 3,619,077 A | * | 11/1971 | Wile | 415/115 |
| 4,229,140 A | * | 10/1980 | Scott | 416/97 R |
| 4,601,638 A | | 7/1986 | Hill et al. | 416/97 R |
| 5,378,108 A | | 1/1995 | Zelesky | 416/97 |
| 5,931,638 A | | 8/1999 | Krause et al. | 416/97 R |
| 6,174,135 B1 | | 1/2001 | Lee | 416/97 R |
| 6,234,754 B1 | | 5/2001 | Zelesky et al. | 416/97 R |
| 6,241,466 B1 | | 6/2001 | Tung et al. | 415/115 |

* cited by examiner

Primary Examiner—Ninh Nguyen
(74) Attorney, Agent, or Firm—Rodney M. Young; Pierce Atwood

(57) ABSTRACT

A hollow cooled turbine airfoil is provided having pressure and suction side walls and a plurality of trailing edge cooling passages that feed cooling air bleed slots at the trailing edge. The airfoil trailing edge is selectively thickened in the root portion so as to allow shortened trailing edge slots, thereby improving trailing edge cooling and reducing mechanical and thermal stresses.

20 Claims, 3 Drawing Sheets

TURBINE AIRFOIL FOR GAS TURBINE ENGINE

BACKGROUND OF THE INVENTION

The present invention relates generally to gas turbine engines, and more particularly to hollow air cooled airfoils used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

The turbine rotor comprises a row of rotor blades mounted to the perimeter of a rotor disk that rotates about the centerline axis of the engine. Each rotor blade typically includes a shank portion having a dovetail for mounting the blade to the rotor disk and an airfoil that extracts useful work from the hot gases exiting the combustor. A blade platform, formed at the junction of the airfoil and the shank portion, defines the radially inner boundary for the hot gas stream. The turbine nozzles are usually segmented around the circumference thereof to accommodate thermal expansion. Each nozzle segment has one or more nozzle vanes disposed between inner and outer bands for channeling the hot gas stream into the turbine rotor.

The high pressure turbine components are exposed to extremely high temperature combustion gases. Thus, the turbine blades and nozzle vanes typically employ internal cooling to keep their temperatures within certain design limits. The airfoil of a turbine rotor blade, for example, is ordinarily cooled by passing cooling air through an internal circuit. The cooling air normally enters through a passage in the blade's root and exits through film cooling holes formed in the airfoil surface, thereby producing a thin layer or film of cooling air that protects the airfoil from the hot gases. Known cooling arrangements often include a plurality of openings in the trailing edge through which cooling air is discharged. These openings may take the form of holes, or of a pressure-side bleed slot arrangement, in which the airfoil pressure side wall stops short of the extreme trailing edge of the airfoil, creating an opening which is divided into individual bleed slots by a plurality of longitudinally extending lands incorporated into the airfoil casting. These slots perform the function of channeling a thin film of cooling air over the surface of the airfoil trailing edge. Airfoils having such a pressure-side bleed slot arrangement are known to be particularly useful for incorporating a thin trailing edge. In effect, the trailing edge thickness of the airfoil is equal to that of the suction side wall thickness alone. This is desirable in terms of aerodynamic efficiency.

Unfortunately, there are several problems associated with this geometry at the root of the airfoil. The trailing edge of most turbine blades is unsupported due to a large trailing edge overhang and is subject to mechanically and thermally induced stresses. The trailing edge blade root of an overhung blade is in compression considering mechanical stress only. In operation, there are significant thermal gradients from the trailing edge to adjacent regions of the blade, causing the trailing edge to be in compression considering thermal stress only. Additionally, in some designs the trailing edge root slot stops short of the blade fillet, resulting in a region below the root slot that is essentially uncooled which further exacerbates the radial and axial thermal gradients. The total stress of the trailing edge is the summation of these mechanical and thermal stresses, and can be at an undesirable level because both stress components are compressive. Because of these circumstances, the root slot is prone to thermal fatigue cracking.

Accordingly, there is a need for an airfoil having improved trailing edge root slot life.

BRIEF SUMMARY OF THE INVENTION

The above-mentioned need is met by the present invention, which provides a hollow cooled turbine airfoil having pressure and suction side walls and a plurality of trailing edge cooling passages that feed cooling air bleed slots at the trailing edge. The airfoil trailing edge is selectively thickened in the root portion so as to allow shortened trailing edge slots, thereby improving trailing edge cooling and reducing mechanical stresses.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
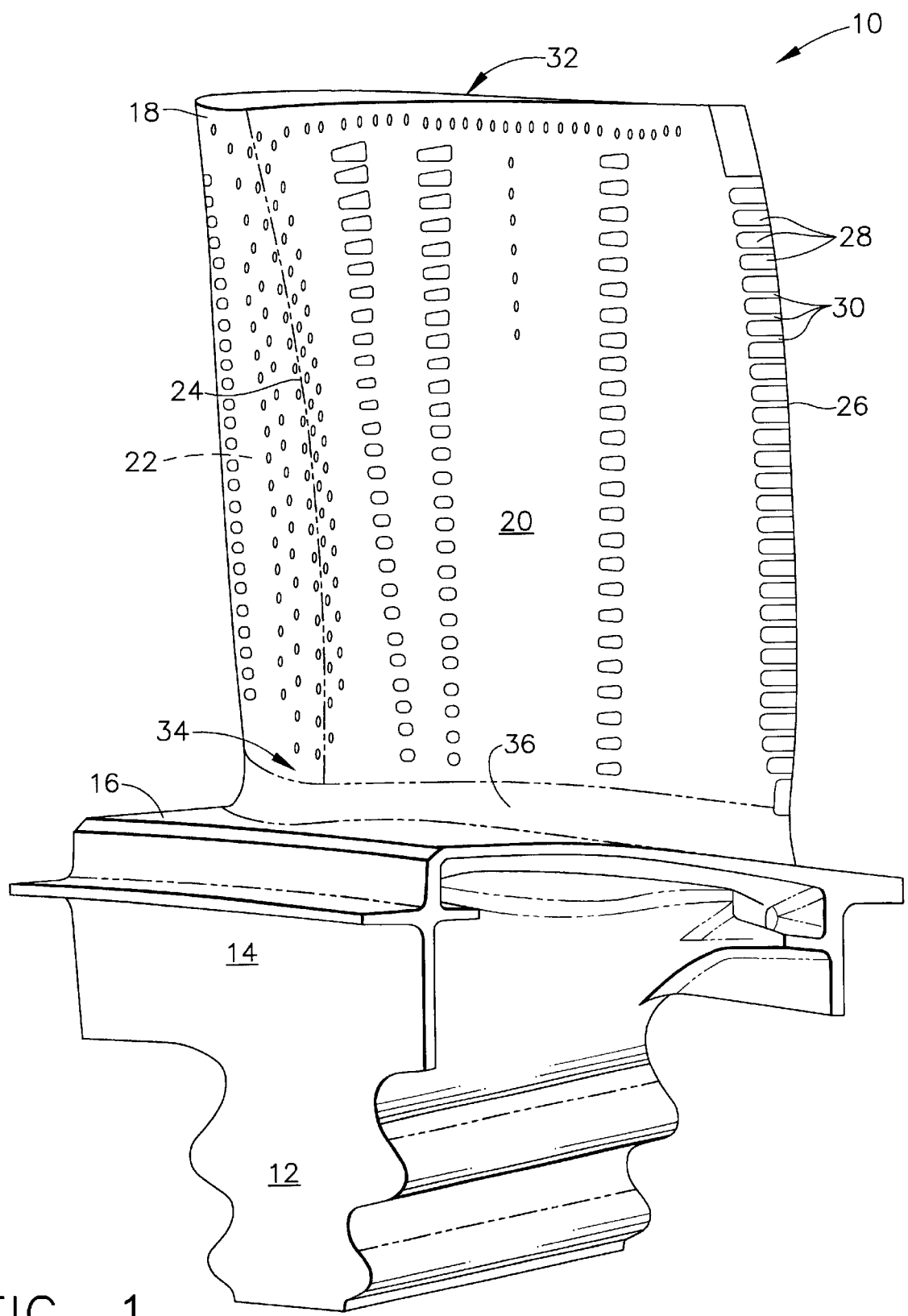
FIG. 1 is a perspective view of a turbine blade embodying the cooling configuration of the present invention.

Referring to the drawings wherein identical reference numerals denote the same elements throughout the various views, FIG. 1 illustrates an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. The platform defines a portion of the combustion gases past the turbine blade 10. A hollow airfoil 18 extends radially outwardly from the platform 16 and into the hot gas stream. A fillet 36 is disposed at the junction of the airfoil 18 and the platform 16. The airfoil 18 has a concave pressure side wall 20 and a convex suction side wall 22 joined together at a leading edge 24 and at a trailing edge 26. The airfoil 18 may take any configuration suitable for extracting energy from the hot gas stream and causing rotation of the rotor disk. The blade 10 is preferably formed as a one-piece casting of a suitable superalloy, such as a nickel-based superalloy, which has acceptable strength at the elevated temperatures of operation in a gas turbine engine. The blade incorporates a number of trailing edge bleed slots 28 on the pressure side 20 of the airfoil. The bleed slots 28 are separated by a number of longitudinally extending lands 30.

The cooling effectiveness of the trailing edge slots 28 is related to their length L (see FIG. 4), which is the distance from the trailing edge cooling passage exit 48 to the trailing edge 26. The longer the slot length L, the less is the trailing edge cooling effectiveness because the hot flowpath gases passing over the airfoil upstream of the extreme trailing edge tend to mix with the cooling air discharged from the cooling passages 46. In contrast, a shorter slot 28 tends to minimize this mixing and therefore improve cooling efficiency.

The trailing edge slot length L (FIG. 4) is controlled by several parameters. Fixing these parameters results in a nominal value of the slot length L for a given airfoil. The wedge angle W is the included angle between the outer surfaces of the airfoil 18 and is typically measured towards the aft end of the airfoil 18, where the airfoil surfaces have the least curvature. The trailing edge thickness T is defined as the airfoil wall thickness at a predetermined small distance, for example 0.762 mm (0.030 in.), from the extreme aft end of the airfoil 18. The combination of the wedge angle W and the trailing edge thickness T determine the maximum overall airfoil thickness at each location along the aft portion of the airfoil. The overall airfoil thickness at the exit 48 of the trailing edge cooling passage 46 is denoted A and has a certain minimum dimension, as described more fully below. It would be possible to decrease the slot length L from the nominal value by increasing the wedge angle W, thus increasing dimension A. However, increasing wedge angle W and therefore the overall airfoil thickness would have a detrimental effect on aerodynamic performance. Dimension A is also equal to the sum of the pressure side wall thickness P, the suction side wall thickness S, and the trailing edge cooling passage width H. Reduction of dimensions P, S, or H would allow the slot length L to be reduced from the nominal value without increasing dimension A. However, there is a minimum trailing edge passage width H required in order to avoid excessive breakage of the ceramic cores used to produce the passages 46 during the casting process of the blade 10 and to provide the required cooling airflow. Also, there is a minimum thickness P required of the pressure-side wall 20 and a minimum thickness S required of the suction side wall 22 for mechanical integrity.

Figure 4:
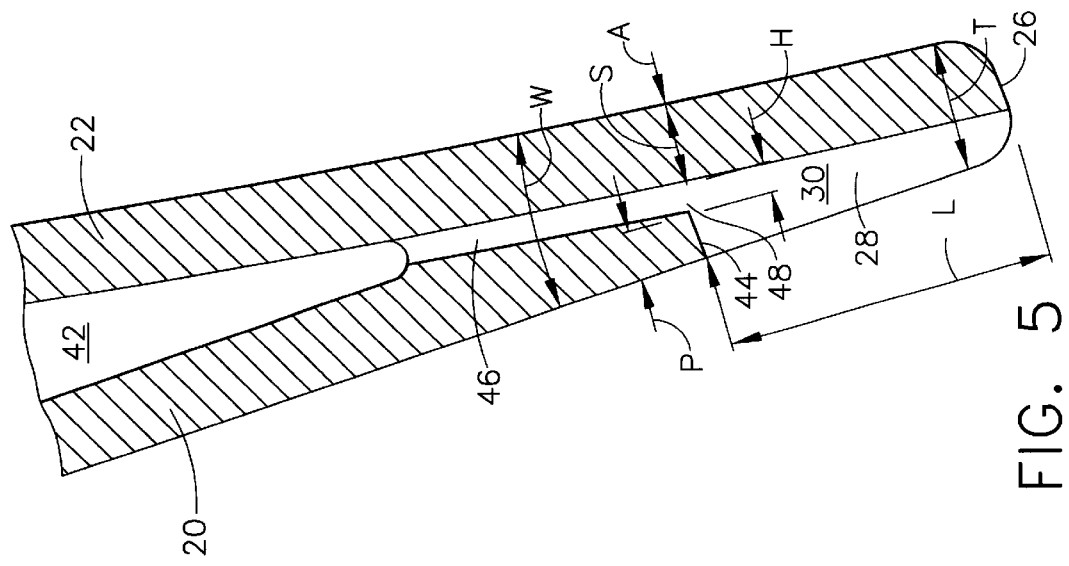
FIG. 4 is a partial cross-sectional view of a turbine blade taken along lines 4—4 of FIG. 2.
Figure 5:
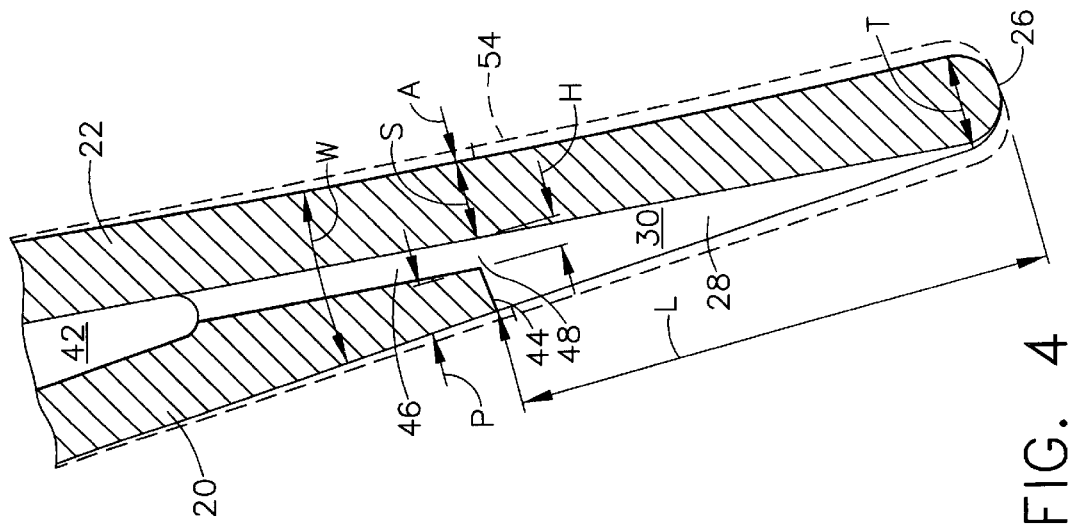
FIG. 5 is a partial cross-sectional view of a turbine blade taken along lines 5—5 of FIG. 2.

FIG. 4 shows the configuration of the trailing edge of the airfoil 18 at a mid-span position, which is unchanged relative to a nominal or baseline turbine blade of similar design. The pressure side wall 20 and suction side wall 22 are separated by an internal cavity 42. The side walls taper inwards toward the trailing edge 26. The suction side wall 22 continues unbroken the entire length of the blade all the way to the trailing edge 26, whereas the pressure side wall 20 has an aft-facing lip 44 so as to expose an opening in the trailing edge 26, which is divided by lands 30 into a plurality of trailing edge slots 28. The aft-facing lip 44 defines the position of the trailing edge cooling passage exit 48. In this type of turbine blade, the trailing edge thickness at the aft end of the blade is essentially equal to the thickness of the suction side wall 22 alone.

Figure 2:
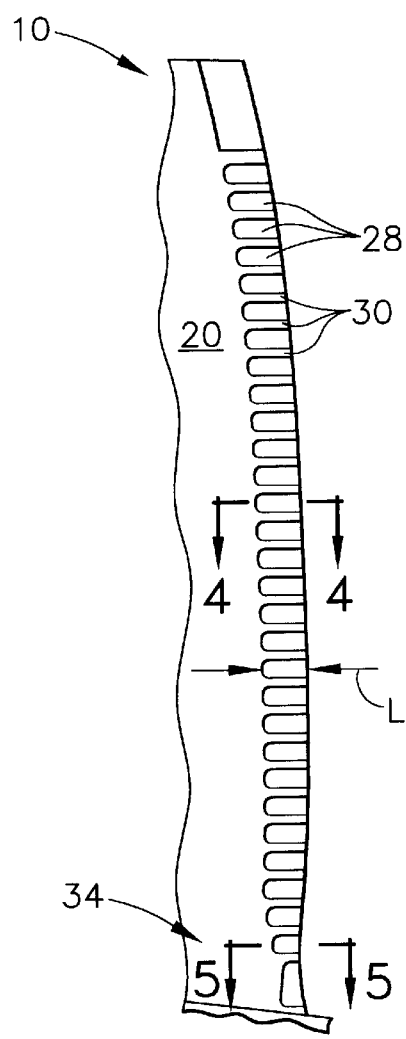
FIG. 2 is a partial side elevational view of a turbine blade incorporating a first embodiment of the present invention.

Referring to FIG. 2, an exemplary embodiment of the blade 10 has a generally radial array of trailing edge pressure side bleed slots 28. The majority of the slots 28 are of equal length L. The value of L for the majority of the slots is the nominal slot length for the particular blade design, as described above. However, one or more of the slots 28 close to the root 34 of the blade 10 are shorter than the remainder of the slots 28. This improves cooling efficiency at the root portion of trailing edge 26 by reducing mixing of hot combustion gases with the flow of cooing air. In an exemplary embodiment, the slot 28 closest to the root 34 is the shortest. The adjacent slots are also shortened, but to a lesser degree, so that the slot length L gradually increases from that of the slot 28 closest to the root 34, with each successive slot 28 in the radially outward direction being slightly longer than the previous slot 28, as illustrated in FIG. 2. Radially outward of the last of these transitional slots 28, the remainder of the slots 28 are the nominal slot length L. While FIG. 2 shows the three radially innermost slots 28 as having a reduced length, it should be noted that the present invention is not so limited. There could be fewer or greater slots 28 having a shorter length than the remainder of the slots 28. As more fully explained below, the modification to the blade's external contour required to incorporate the shortened slots 28 should be arranged so as to have a minimal impact on aerodynamic performance of the blade 10. Therefore, it is desirable to incorporate the shortened slots 28 to only the root portion where they are most needed to address excessive mechanical and thermal stresses. Accordingly, in the exemplary embodiment described herein, the transition to the nominal slot length, and thus the taper of the additional blade thickness in the radial direction, is completed within approximately 20% of the blade span measured from root 34 to the tip 32. Increasing the distance over which the taper extends would increase the thickness of the blade near the trailing edge over a larger portion of the span, allowing the shortening of more of slots 28 and better cooling, whereas reducing the length of the taper would provide a thinner trailing edge over a larger portion of the span and allow for better aerodynamic performance. These two considerations represent a tradeoff and the taper can be varied to suit a particular application. For example, the taper could extend the entire span of the blade, or it could extend only enough to accommodate one shortened trailing edge slot 28.

In order to incorporate the shortened trailing edge slots 28, some allowance must be made in the airfoil cross-section, as described above. Ordinarily, one of the pressure side wall thickness P, slot width H, suction side wall thickness S, or wedge angle W must be changed. In the present invention, the above-listed dimensions have been maintained constant, and the overall airfoil thickness near the trailing edge at the root has been increased. In other words, by increasing the airfoil thickness in the region of the shortened slots 28 relative to the rest of the airfoil, it is possible to reduce the slot length L without changing parameters P, H, S, or W. It should be noted that dimension A, the total airfoil thickness at the exit 48 of the cooling passage 46, is the same absolute value at section 5—5 as at section 4—4, despite the shorter slot length L at section 5—5. This allows the required minimum values of pressure side wall thickness P, cooling passage width H, and suction side wall thickness S to be maintained. The extra thickness is incorporated equally between the two sides of the airfoil relative to the baseline contour, allowing the same absolute value of dimension A to occur at a point further aft along the chord of the airfoil. The extra thickness is tapered out to zero both axially forward and radially outward. In this manner, the additional thickness is used only where required in order to minimize its effect on the aerodynamic performance of the airfoil. In an exemplary embodiment, there is about 0.127 mm (0.005 in.) of added thickness on each side of the blade at the root 34 of the trailing edge 26, and the additional thickness is tapered out to zero at a point approximately 10 mm (0.4 in.) from the trailing edge 26 on each side of the blade. However, the amount of additional thickness and the axial taper distance could be varied to suit a particular application. The additional thickness is shown by the dashed line 54 in FIG. 4. As an additional benefit, this increase in the cross-sectional area of the blade at the root increases the moment of inertia of the blade, increasing the blade stiffness and lowering the compressive bending stresses in the trailing edge root.

Figure 3:
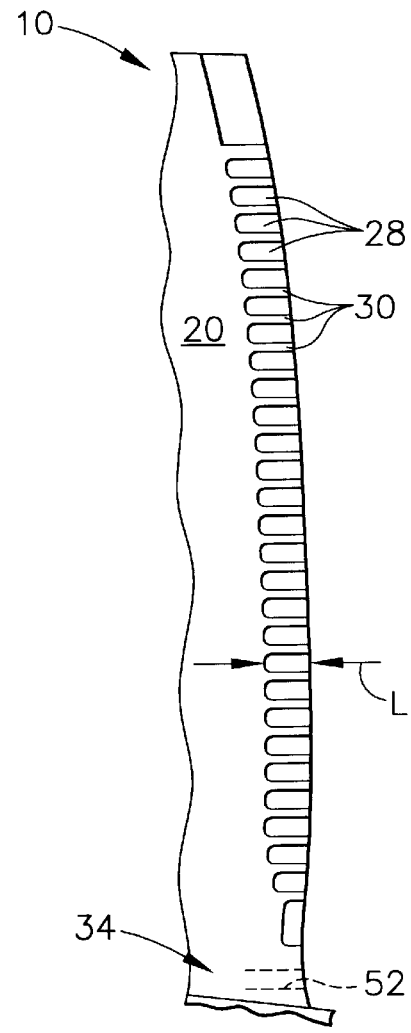
FIG. 3 is a partial side elevational view of a turbine blade incorporating an alternative embodiment of the present invention.

An alternate embodiment of the present invention is shown in FIG. 3. In this embodiment, the blade also has a radial array of trailing edge pressure side bleed slots 28. The majority of the trailing edge slots 28 are of equal length L, which is the nominal length as described above. However, in this embodiment, the slot 28 closest to the root 34 is replaced with a generally axially extending cooling passage 52, which may be a hole of circular cross-section, or any other convenient shape. The passage 52 is in fluid communication with the internal cavity 42 and conducts cooling air axially rearward to provide convection cooling to the trailing edge 26. Adjacent to and radially outside the cooling passage 52 one or more of the slots 28 close to the cooling passage 52 are shorter than the remainder of the slots 28. In an exemplary embodiment, the slots are shortened to a progressively decreasing degree in the radially outward direction, so that the slot length L gradually increases from that of the slot 28 closest to the cooling passage 52, with each successive slot 28 in the radially outward direction being slightly longer than the previous slot 28, as illustrated in FIG. 3. The remainder of the slots 28, radially outward of the last of these transitional slots, are the nominal slot length L. Again, in this exemplary embodiment, the transition to the nominal slot length L, and thus the taper of the additional blade thickness in the radial direction, is generally complete by approximately 20% of the blade span measured from root 34 to the tip 32. However, this taper could be modified, as described above. It is also contemplated that more than one slot position could be supplanted by additional cooling passages 52, providing further enhanced cooling.

The present invention has been described in conjunction with an exemplary embodiment of a turbine blade. However, it should be noted that the invention is equally applicable to any hollow fluid directing member, including, for example stationary turbine nozzles airfoils disposed between a flowpath structure (e.g. inner and outer nozzle bands), as well as rotating blades.

The foregoing has described a turbine airfoil having improved cooling through the incorporation of shortened trailing edge cooling slots and a thickened trailing edge root. While specific embodiments of the present invention have been described, it will be apparent to those skilled in the art that various modifications thereto can be made without departing from the spirit and scope of the invention as defined in the appended claims.

What is claimed is:

1. An airfoil having a leading edge, a trailing edge, a root, and a tip, comprising:
   a pressure side wall extending from said leading edge to said trailing edge;
   a suction side wall extending from said leading edge to said trailing edge;
   a plurality of slots disposed in said pressure side wall adjacent said trailing edge, said slots having a length in an axial direction, wherein the length of at least said slot closest to said root is less than the length of the remainder of said slots, and wherein said trailing edge has a section of selectively increased thickness adjacent said root, and said slot closest to said root is disposed in said section of selectively increased thickness.

2. The airfoil of claim 1 further comprising at least one transition slot disposed radially outward of said slot closest to said root, said transition slot having a length greater than the length of said root slot, and less than the length of the remainder of said slots.

3. The airfoil of claim 2 further comprising additional transition slots, the lengths of said transitional slots being progressively greater in a radially outward direction.

4. The airfoil of claim 1 wherein said trailing edge has a thickness, said thickness being greater at said root than at the remainder of said trailing edge.

5. The airfoil of claim 1 further comprising a cooling passage disposed in said trailing edge radially inward of said slot closest to said root.

6. The airfoil of claim 5 further comprising at least one transition slot disposed between said cooling passage and said plurality of slots said transition slot having a length greater than that of said slot closest to said root and less than that of said plurality of slots.

7. The airfoil of claim 6 further comprising additional transition slots, wherein each of said transitional slots has a progressively greater length in a radially outward direction.

8. The airfoil of claim 7 wherein said trailing edge has a section of selectively increased thickness adjacent said root, and said cooling passage, said slot closest to said root, and said transition slots are disposed in said section of selectively increased thickness.

9. The airfoil of claim 5 further comprising additional cooling passages disposed in said trailing edge between said cooling passage and said transition slots.

10. A fluid directing member comprising:
    an airfoil having a leading edge and a trailing edge, a pressure side wall extending from said leading edge to said trailing edge, and first and second ends;
    a flowpath structure joined to said airfoil at said first end;
    fillet disposed at the junction of said airfoil and said flowpath structure;
    a plurality of slots disposed in said pressure side wall adjacent said trailing edge, said slots having a length in an axial direction, wherein the length of at least said slot closest to said fillet is less than that of the rest of the slots.

11. The fluid directing member of claim 10 further comprising at least one transition slot disposed adjacent said slot closest to said fillet, said transition slot having a length greater than the length of said slot closest to said fillet, and less than the length of the remainder of said slots.

12. The fluid directing member of claim 11 further comprising additional transition slots, the lengths of said transitional slots being progressively greater in a direction towards said second end of said airfoil.

13. The airfoil of claim 12 wherein said trailing edge has a section of selectively increased thickness adjacent said fillet, and said slot closest to said fillet and said transition slots are disposed in said section of selectively increased thickness.

14. The airfoil of claim 10 wherein said trailing edge has a thickness, said thickness being greater near said fillet than at the remainder of said trailing edge.

15. The airfoil of claim 10 further comprising a cooling passage disposed in said trailing edge between said slot closest to said fillet and said fillet.

16. The airfoil of claim 15 further comprising at least one transition slot disposed between said cooling passage and said plurality of slots, said transition slot having a length greater than that of said slot closest to said fillet and less than that of said plurality of slots.

17. The airfoil of claim 16 further comprising additional transition slots, wherein each of said transitional slots has a progressively greater length in a direction towards said second end of said airfoil.

18. The airfoil of claim 17 wherein said trailing edge has a section of selectively increased thickness adjacent said fillet, and said cooling passage, said slot closest to said fillet, and said transition slots are disposed in said section of selectively increased thickness.

19. The airfoil of claim 15 further comprising additional cooling passages disposed in said trailing edge between said cooling passage and said transition slots.

20. An airfoil having a leading edge, a trailing edge, a root, and a tip, comprising:

a pressure side wall extending from said leading edge to said trailing edge;

a suction side wall extending from said leading edge to said trailing edge;

a plurality of slots disposed in said pressure side wall adjacent said trailing edge, said plurality of slots comprising a first group of slots disposed adjacent said root and a second group of slots disposed radially outward of said first group, said second group comprising the majority of said plurality of slots, wherein said first group Includes the slot closest to said root, which has the shortest axial length of said plurality of slots, and at least one transition slot, said slots of said first group having a progressively greater axial length in a radially outward direction; and wherein the slots of said second group have a substantially equal length in an axial direction, said length being greater than that of any of said slots of said first group.

\* \* \* \* \*